United States Patent
Kalender et al.

(10) Patent No.: US 11,953,716 B2
(45) Date of Patent: Apr. 9, 2024

(54) SPACER FOR AN ASSEMBLY OF A BACKLIGHT OF A DISPLAY

(71) Applicant: Continental Automotive GmbH, Hannover (DE)

(72) Inventors: Sait Kalender, Darmstadt (DE); Jörg Thomas, Dietzenbach (DE); Oliver Jakoby, Heusenstamm (DE); Nils Arnold, Darmstadt (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 17/737,280

(22) Filed: May 5, 2022

(65) Prior Publication Data

US 2022/0357505 A1    Nov. 10, 2022

(30) Foreign Application Priority Data

May 5, 2021    (DE) ...................... 10 2021 204 507.3

(51) Int. Cl.
*F21V 8/00* (2006.01)

(52) U.S. Cl.
CPC ......... *G02B 6/0088* (2013.01); *G02B 6/0076* (2013.01); *G02B 6/005* (2013.01)

(58) Field of Classification Search
CPC .. G02B 6/0075; G02B 6/0076; G02B 6/0078; G02B 6/008; G02F 1/133308; G02F 1/133317; G02F 1/13342; G02F 1/133608
See application file for complete search history.

(56) References Cited

U.S. PATENT DOCUMENTS

| | | | |
|---|---|---|---|
| 11,209,585 B2 * | 12/2021 | Hirasawa | ................ F21V 19/00 |
| 2004/0135936 A1 | 7/2004 | Lee | |
| 2008/0123015 A1 | 5/2008 | Tanaka | |
| 2009/0033825 A1 | 2/2009 | Fukayama et al. | |
| 2009/0051851 A1 | 2/2009 | Horiuchi et al. | |
| 2012/0120326 A1 | 5/2012 | Takata | |
| 2012/0169967 A1* | 7/2012 | Han | ..................... G02F 1/1333 349/62 |
| 2014/0029295 A1 | 1/2014 | Hsiao et al. | |
| 2014/0118662 A1 | 5/2014 | Wang et al. | |
| 2014/0146269 A1 | 5/2014 | Kim et al. | |
| 2014/0286053 A1 | 9/2014 | Momose et al. | |

(Continued)

FOREIGN PATENT DOCUMENTS

| CN | 106023801 A | 10/2016 |
|---|---|---|
| DE | 102008039642 A1 | 4/2009 |

(Continued)

OTHER PUBLICATIONS

Office Action dated Dec. 21, 2021 from corresponding German patent application No. 10 2021 204 507.3.

(Continued)

*Primary Examiner* — Keith G. Delahoussaye

(57) ABSTRACT

The present disclosure relates to a spacer for an assembly of a backlight of a display. The disclosure additionally relates to an assembly for a backlight of a display having such a spacer, and to a display having a backlight having such an assembly. The spacer comprises at least one crosspiece. The crosspiece in this case has attachment surfaces for attachment of a first light guide and a second light guide and a receptacle for a sheet stack.

15 Claims, 3 Drawing Sheets

(56) References Cited

U.S. PATENT DOCUMENTS

| | | | |
|---|---|---|---|
| 2016/0259121 A1 | 9/2016 | Yonezawa et al. | |
| 2017/0123133 A1* | 5/2017 | Park | G02B 6/0078 |
| 2017/0299804 A1 | 10/2017 | Sun et al. | |
| 2017/0363794 A1 | 12/2017 | Wan et al. | |
| 2018/0039016 A1* | 2/2018 | Wang | G02B 6/0091 |
| 2018/0074249 A1 | 3/2018 | Hirasawa | |

FOREIGN PATENT DOCUMENTS

| | | |
|---|---|---|
| DE | 112012006950 T5 | 6/2015 |
| EP | 3187913 A1 | 7/2017 |
| KR | 20100112679 A | 10/2010 |

OTHER PUBLICATIONS

Search Report dated Sep. 5, 2022 from corresponding European patent application No. 22170358.0.
Decision to Grant dated Feb. 9, 2024 from corresponding European patent application No. 22170358.0.

* cited by examiner

SPACER FOR AN ASSEMBLY OF A BACKLIGHT OF A DISPLAY

CROSS REFERENCE TO RELATED APPLICATIONS

This U.S. patent application claims the benefit of German patent application No. 10 2021 204 507.3, filed May 5, 2021, which is hereby incorporated by reference.

TECHNICAL FIELD

The present disclosure relates to a spacer for an assembly of a backlight of a display. The disclosure additionally relates to an assembly for a backlight of a display having such a spacer, and to a display having a backlight having such an assembly.

BACKGROUND

Nowadays, backlights of displays are typically based on light guides into which the light from a plurality of light-emitting diodes is coupled. The light propagates in the light guide due to total internal reflection and is coupled out again with the aid of microstructures on the light guide, with the result that a homogeneous light distribution is obtained. This construction allows very compact and efficient illumination of displays with a broad emission characteristic.

In this connection, US 2008/0123015 A1 describes a liquid crystal module with a liquid crystal panel, optical sheets, a light source, a frame, and flexible printed circuit boards. The frame accommodates the liquid crystal panel, the optical sheets, and the light source. Spacers ensure that the optical sheets are disposed at a distance from the liquid crystal panel.

DE 10 2008 039 642 A1 describes a display apparatus having a film-type light-guide plate unit. The light-guide plate unit has a film-type light-guide plate and a carrier frame made from a film material. The carrier frame is configured such that it holds the outer circumferential periphery of the film-type light-guide plate. Optical sheets, which comprise the film-type light-guide plate, a diffusion sheet, a prism sheet and the like, are arranged within the carrier frame.

Increasingly, constructions having two or more light guides are used, which additionally have a plurality of optical sheets. The sheets and light guides must not be pressed together in this case. However, the distance between the parts must not be increased arbitrarily either, or must be minimized. For displays existing today, all integral parts of the backlight are placed individually into a housing and locked in with a closing component part. Positioning and centering of a plurality of light guides represents a particular challenge for example for constructions having two or more light guides and results in a relatively large tolerance build-up between the components of the backlight and thus to a relatively poor implementation of the optical performance characteristics.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect, a spacer for an assembly of a backlight of a display comprises at least one crosspiece. The crosspiece in this case comprises attachment surfaces for attachment of a first light guide and a second light guide and a receptacle for a sheet stack.

The solution according to the disclosure provides a spacer which is designed to combine the individual component parts into one package. The spacer makes it possible to combine the light guides and sheets to form a subassembly. Owing to the crosspiece with the attachment surfaces, a precise distance between the light guides and for example between the sheet stack and the second light guide is ensured. The spacer thus simultaneously connects the light guides and sets the distance. In this way, optimum optical properties of the construction are achieved. In addition, an additional holding element, known as a retainer, is not required.

According to an embodiment, the spacer further comprises alignment elements for aligning the first light guide, the second light guide, or the sheet stack. It is possible for geometries to be incorporated into the spacer, for example stop surfaces, stop ribs, openings etc., which are used to position the integral parts and prevent incorrect installation. Positioning and centering of the parts in the overall device may be optimized with regard to the tolerance build-up by using such alignment elements. In addition, the light guides themselves need no or only few additional geometries, such as pins, ribs, lugs, notches etc. This ensures that the light is not negatively influenced as it propagates in the light guides.

According to an embodiment, the receptacle for the sheet stack is formed by a cutout in the at least one crosspiece. In this way, a contact surface for the sheet stack is implemented in the crosspiece, by means of which contact surface the precise distance between the sheet stack and the second light guide may be ensured particularly reliably.

According to an embodiment, the spacer is designed to optically screen off the first light guide and the second light guide from one another. This ensures that no undesired light is coupled into the light guides. The spacer may for this purpose take on the function of a reflective surface, for example.

According to an embodiment, the spacer is designed for use as a positioning element and holding element in the display. The spacer may have additional geometries with which the spacer may be positioned and secured in the overall device. This simplifies the installation of the spacer in the overall device.

According to another aspect, an assembly for a backlight of a display comprises a spacer comprising at least one crosspiece with attachment surfaces, a first light guide, a second light guide, and a sheet stack. Such an assembly may be pre-manufactured, which means that the cycle time of the final installation may be reduced. Only the receptacles for an assembly rather than for a plurality of individual parts are required in the overall device. The assembly allows a high level of integration with small tolerances and a compact construction. This allows a narrow design of the overall device with narrow edges.

According to an embodiment, the first light guide and the second light guide are attached to attachment surfaces of the spacer by means of optically clear adhesive sheets. Securing the spacer with the individual integral parts to form one package is accomplished using a double-sided transparent adhesive tape having a low refractive index. By adhesively bonding the components in this way, a robust construction with a reduced susceptibility to rattling noises is attained. At the same time, excellent optical properties are ensured.

According to an embodiment, the materials of the spacer, of the first light guide, and of the second light guide have substantially the same coefficient of expansion. By selecting suitable materials having the same or at least similar coefficients of expansion, the light-guide assembly is not susceptible with respect to optical or geometric tolerances over a large temperature range. This is for example advantageous for applications in the automotive field. By way of example, the different components may consist of the same basic material, e.g., polycarbonate.

According to another aspect, a display uses a backlight with an assembly comprising at least one crosspieve with attachment surfaces, a first light guide, a second light guide, and a sheet stack. Such a display may be installed for example in a means of transport, e.g., in a motor vehicle. The backlight further comprises, adjacent to the assembly, a printed circuit board having two or more light sources. Due to the robust construction and the low susceptibility with respect to rattling noises, a backlight according to the disclosure is particularly suitable for the high stresses occurring in the automotive field.

BRIEF DESCRIPTION OF THE DRAWINGS

The present disclosure will become more fully understood from the detailed description and the accompanying drawings, wherein.

DETAILED DESCRIPTION

For a better understanding of the principles of the present disclosure, embodiments of the disclosure will be explained in more detail below with reference to the Figures. The same reference signs will be used in the Figures for identical or functionally identical elements and are not necessarily described again for each Figure. It is to be understood that the disclosure is not restricted to the illustrated embodiments and that the features described may also be combined or modified without departing from the scope of protection of the disclosure as defined in the appended claims.

Figure 1:
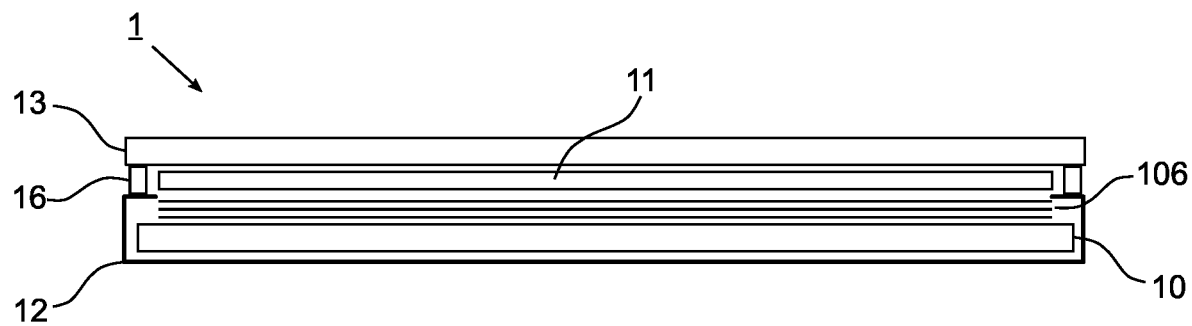
FIG. 1 schematically shows a section through a display with a backlight.

FIG. 1 schematically shows a section through a display 1 with a backlight. The display 1 comprises a display panel 11 and a backlight 10 for the display panel 11. Additional optical layers, for example polarization filters, light-directing sheets (prism sheets, lens sheets etc.) or light-scattering sheets (diffusers), may be arranged in the form of a sheet stack 106 between the backlight 10 and the display panel 11. The backlight 10 and the sheet stack 106 are arranged in a housing 12 of the display 1 and form a first assembly. The housing 12 is closed with respect to the environment by a cover glass 13, which together with the display panel 11 forms a second assembly. Both assemblies are kept together by way of an adhesive connection 16, e.g., with liquid adhesive. The display panel 11 may be, for example, a liquid crystal display (LCD).

Figure 2:
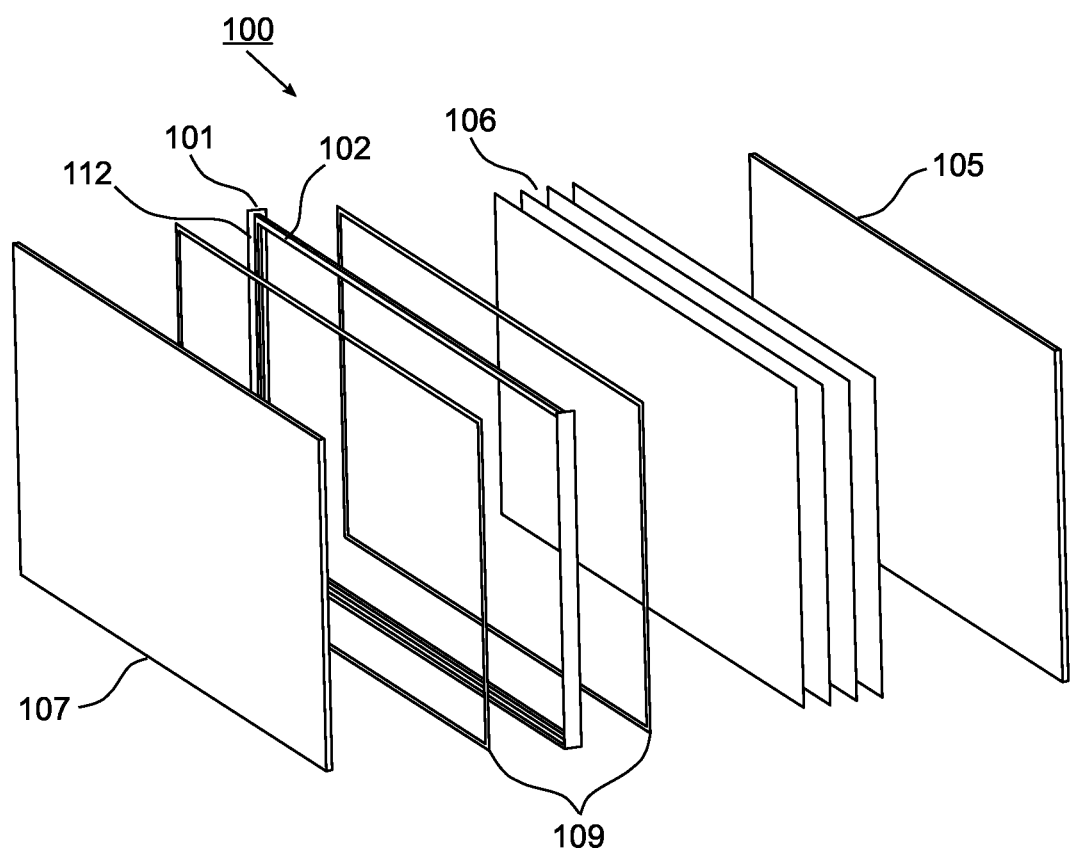
FIG. 2 schematically shows an exploded view of an assembly according to the disclosure for a backlight of a display.

FIG. 2 schematically shows an exploded view of an assembly 100 according to the disclosure for a backlight of a display. The assembly 100 in this embodiment comprises a first light guide 105, a number of optical sheets that together form a sheet stack 106, a spacer 101, and a second light guide 107. The assembly 100 additionally has two optically clear adhesive sheets 109 for attaching the first light guide 105 and the second light guide 107 to the spacer 101. The adhesive sheets 109 are double-sided transparent adhesive tape having a low refractive index. The spacer 101 in this embodiment has a frame 112 on three sides and a crosspiece 102. On a side at which light is intended to be coupled into the light guides 105, 107, the spacer 101 merely has a crosspiece 102. However, the frame 112 may also be formed on fewer than three sides of the spacer 101 or even be entirely omitted. In that case, walls may be separately mounted for screening off light. The materials of the spacer 101, of the first light guide 105, and of the second light guide 107 have substantially the same coefficient of expansion. For this purpose, the different components may consist of the same basic material, e.g., polycarbonate.

Figure 3:
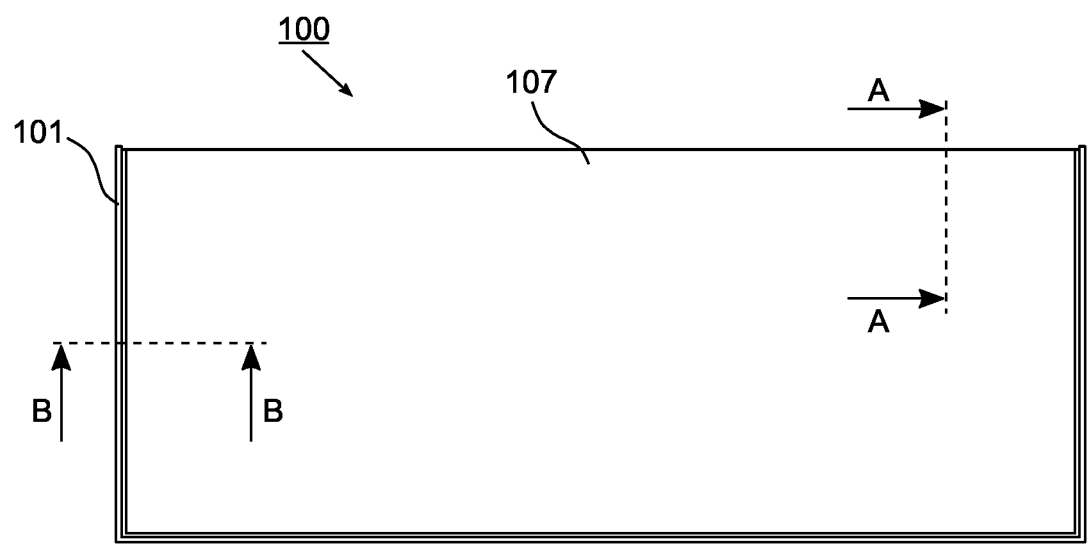
FIG. 3 schematically shows a top view of an assembly according to the disclosure for a backlight of a display.

FIG. 3 schematically shows a top view of an assembly 100 according to the disclosure for a backlight of a display. This view shows only the spacer 101 and the second light guide 107. The remaining components of the assembly 100 are covered. Also drawn in is the location of two section planes A-A and B-B, which are illustrated in FIG. 4 and FIG. 5 and provide details relating to the construction of the assembly 100.

Figure 4:
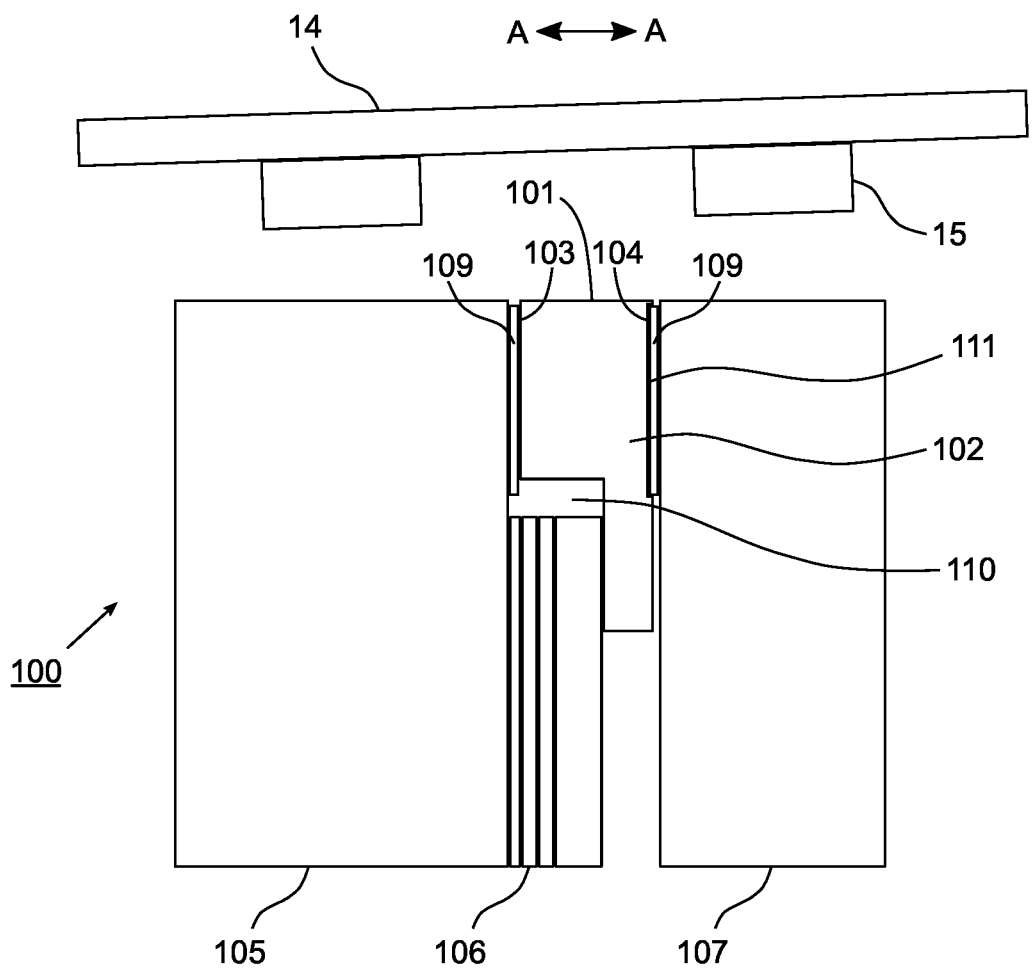
FIG. 4 schematically shows a section along a first plane through an assembly according to the disclosure for a backlight of a display.

FIG. 4 schematically shows a section along a first plane through the assembly 100 according to the disclosure for a backlight of a display. FIG. 4 in this case illustrates the section along the plane A-A from FIG. 3. The first light guide 105, the sheet stack 106 arranged on the first light guide 105, and the second light guide 107 are easily discernible. The two light guides 105, 107 are adhesively bonded to attachment surfaces 103, 104 of the crosspiece 102 of the spacer 101 by the adhesive sheets 109. To receive the adhesive sheet 109, the crosspiece 102 may have a depression 111. A cutout 110 of the spacer 101 forms a receptacle for the sheet stack 106. Owing to the crosspiece 102 with the attachment surfaces 103, 104, a precise distance between the light guides 105, 107 and for example between the sheet stack 106 and the second light guide 107 is ensured. The spacer 101 thus simultaneously connects the light guides 105, 107 and sets the distance. In addition, it optically screens off the first light guide 105 and the second light guide 107 from one another. A printed circuit board 14, on which light sources 15 are located, is arranged adjacent to the assembly 100. The light emitted by said light sources 15 is coupled into the light guides 105, 107 and used to backlight the display panel. For this reason, the spacer 101 has no frame on this side.

Figure 5:
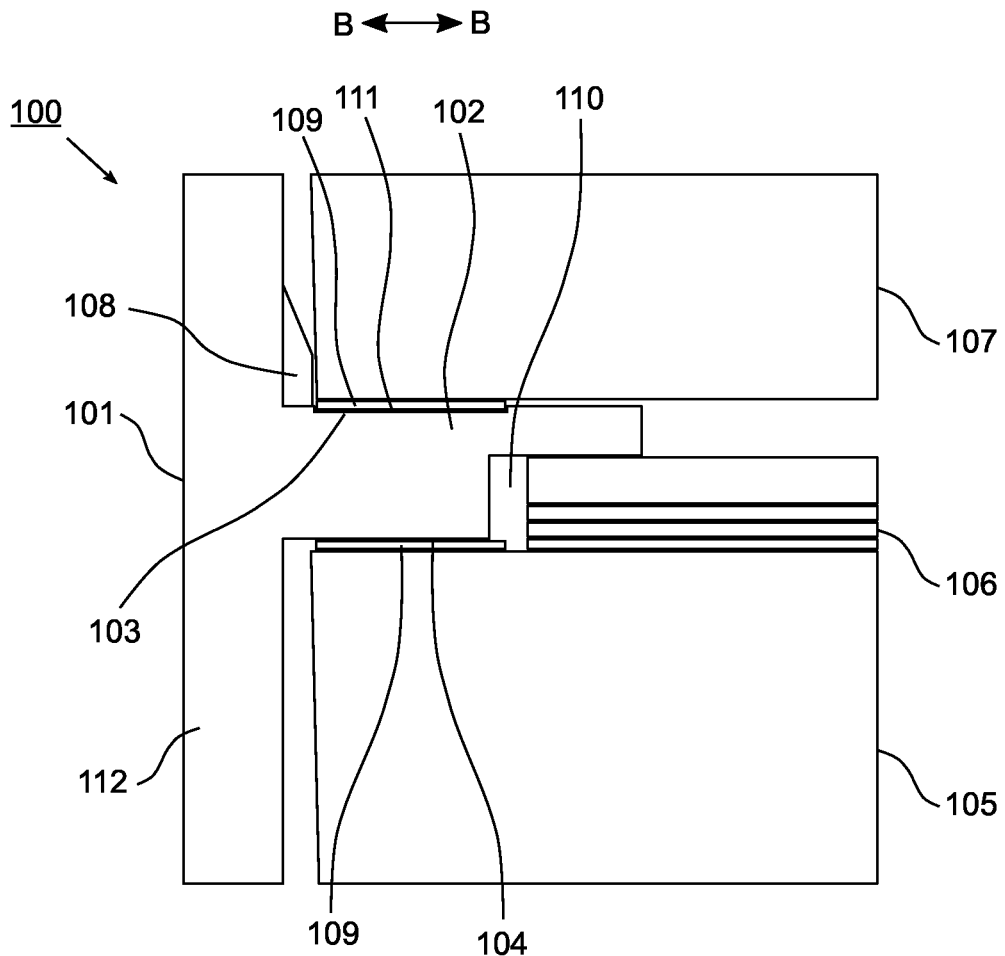
FIG. 5 schematically shows a section along a second plane through an assembly according to the disclosure for a backlight of a display.

FIG. 5 schematically shows a section along a second plane through the assembly 100 according to the disclosure for a backlight of a display. FIG. 5 in this case illustrates the section along the plane B-B from FIG. 3. The first light guide 105, the sheet stack 106 arranged on the first light guide 105, the second light guide 107, and the adhesive sheets 109 by means of which the two light guides 105, 107 are adhesively bonded to the crosspiece 102 of the spacer 101 are again easily discernible. One of the adhesive sheets 109 is arranged, as before, in a depression 111 of the crosspiece 102. In this section plane, the frame 112 of the spacer 101 is also visible. The spacer 101 or the frame 112 may have additional geometries (not illustrated) with which the spacer 101 may be positioned and secured in the overall device. In this way, the spacer 101 simultaneously serves as a positioning element and a holding element in the display. FIG. 5 likewise shows an alignment element 108. Such alignment elements 108 may be used to simplify the positioning of the integral parts and prevent incorrect installation. The alignment element 108 may be designed for example as a stop surface, a stop rib, an opening etc. In the example illustrated, an alignment element 108 is provided only for the second light guide 107. Additionally or alternatively, however, corresponding alignment elements 108 may also be used for the alignment of the first light guide 105 or of the sheet stack.

Figure 6:
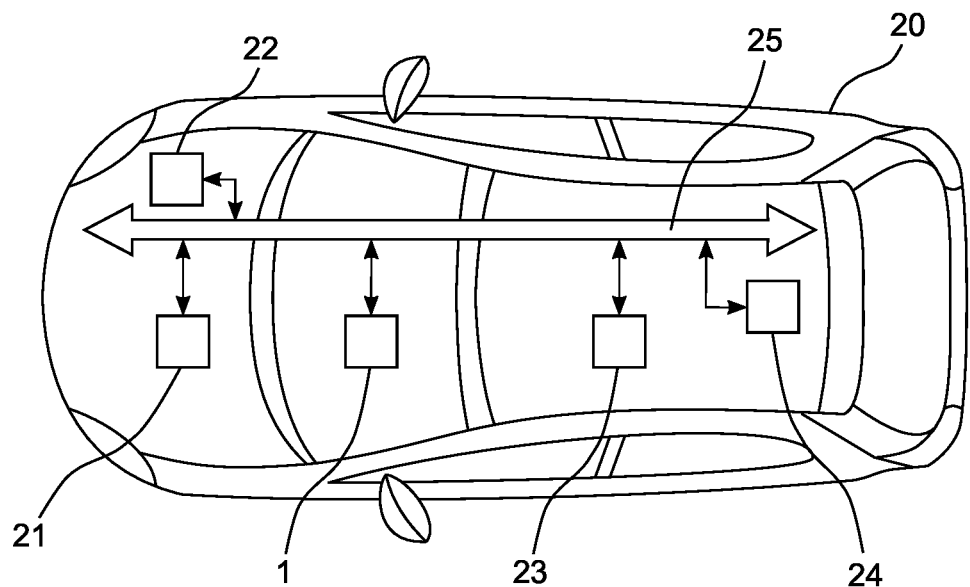
FIG. 6 schematically shows a means of transport in which a solution according to the disclosure is implemented.

FIG. 6 schematically shows a means of transport 20 in which a solution according to the disclosure is implemented. The means of transport 20 is a motor vehicle in this example. The motor vehicle has at least one assistance system 21, which assists a user of the motor vehicle during driving, and a navigation system 22. Information provided by the assistance system 21 or by the navigation system 22 may be displayed on a display 1 according to the disclosure. For example, the display 1 may be an instrument cluster. A connection to a back-end, for instance for receiving updated software for the components of the motor vehicle, may be established by means of a data transfer unit 23. A memory 24 is present for storing data. Data is exchanged between the various components of the motor vehicle via a network 25.

What is claimed is:

1. An assembly for a backlight of a display, the assembly comprising:
    a spacer, comprising:
        at least one crosspiece with attachment surfaces;
    a first light guide;
    a second light guide, wherein the first light guide and the second light guide are attached to attachment surfaces of the spacer by optically clear adhesive sheets; and
    a sheet stack.

2. The assembly as claimed in claim 1, wherein the spacer, the first light guide, and the second light guide have substantially the same coefficient of expansion.

3. The assembly as claimed in claim 1, wherein the spacer comprising the at least one crosspiece with attachment surfaces is for attachment of the first light guide and the second light guide and a receptable for the sheet stack.

4. The assembly as claimed in claim 3, wherein the spacer further comprises alignment elements for aligning the first light guide, the second light guide, or the sheet stack.

5. The assembly as claimed in claim 3, wherein the receptable for the sheet stack is formed by a cutout in the at least one crosspiece.

6. The assembly as claimed in claim 3, wherein the spacer is designed to optically screen off the first light guide and the second light guide from one another.

7. The assembly as claimed in claim 3, wherein the spacer is designed for use as a positioning element and a holding element in the display.

8. A display, comprising:
    a backlight, wherein the backlight further comprises an assembly comprising:
        at least one crosspiece with attachment surfaces;
        a first light guide;
        a second light guide, wherein the first light guide and the second light guide are attached to attachment surfaces of the spacer by optically clear adhesive sheets; and
        a sheet stack.

9. The display as claimed in claim 8, wherein the backlight further comprises a printed circuit board with two or more light sources.

10. An assembly for a backlight of a display, the assembly comprising:
    a spacer, comprising:
        at least one crosspiece with attachment surfaces;
    a first light guide;
    a second light guide, wherein the spacer, the first light guide, and the second light guide have substantially the same coefficient of expansion; and
    a sheet stack.

11. The assembly as claimed in claim 10, wherein the spacer comprising the at least one crosspiece with attachment surfaces is for attachment of the first light guide and the second light guide and a receptable for the sheet stack.

12. The assembly as claimed in claim 11, wherein the spacer further comprises alignment elements for aligning the first light guide, the second light guide, or the sheet stack.

13. The assembly as claimed in claim 11, wherein the receptable for the sheet stack is formed by a cutout in the at least one crosspiece.

14. The assembly as claimed in claim 11, wherein the spacer is designed to optically screen off the first light guide and the second light guide from one another.

15. The assembly as claimed in claim 11, wherein the spacer is designed for use as a positioning element and a holding element in the display.

\* \* \* \* \*